US008978486B2

(12) United States Patent
Takahashi et al.

(10) Patent No.: US 8,978,486 B2
(45) Date of Patent: Mar. 17, 2015

(54) COLLISION DETECTING DEVICE AND COLLISION DETECTING METHOD

(75) Inventors: Hiroyuki Takahashi, Aichi (JP); Sotaro Narita, Toyota (JP); Takatoshi Tanabe, Ichinomiya (JP)

(73) Assignees: Toyota Jidosha Kabushiki Kaisha, Toyota-shi, Aichi (JP); Denso Corporation, Kariya-shi, Aichi (JP)

( * ) Notice: Subject to any disclaimer, the term of this patent is extended or adjusted under 35 U.S.C. 154(b) by 523 days.

(21) Appl. No.: 13/132,088

(22) PCT Filed: Nov. 20, 2009

(86) PCT No.: PCT/JP2009/069699
§ 371 (c)(1),
(2), (4) Date: Jun. 1, 2011

(87) PCT Pub. No.: WO2010/064546
PCT Pub. Date: Jun. 10, 2010

(65) Prior Publication Data
US 2011/0232396 A1 Sep. 29, 2011

(30) Foreign Application Priority Data

Dec. 2, 2008 (JP) ................................. 2008-307805

(51) Int. Cl.
*G01L 5/08* (2006.01)
*B60R 19/48* (2006.01)

(52) U.S. Cl.
CPC .................................... *B60R 19/483* (2013.01)
USPC ....................... 73/862.581; 180/274; 340/436

(58) Field of Classification Search
CPC .... B60R 19/483; B60R 21/34; B60R 21/0136
USPC ......... 73/862.01, 862.381, 862.581–862.584; 480/274; 340/436; 180/274
See application file for complete search history.

(56) References Cited

U.S. PATENT DOCUMENTS 6,561,301 B1 * 5/2003 Hattori et al. ................. 180/274
7,098,778 B1 * 8/2006 Zoratti et al. ................. 340/436

(Continued)

FOREIGN PATENT DOCUMENTS

DE 10 2005 018 588 11/2006
JP 7-36204 7/1995

(Continued)

OTHER PUBLICATIONS

International Search Report in International Application No. PCT/JP2009/069699; Mailing Date: Dec. 22, 2009.

(Continued)

*Primary Examiner* — Randy W Gibson
*Assistant Examiner* — Natalie Huls
(74) *Attorney, Agent, or Firm* — Finnegan, Henderson, Farabow, Garrett & Dunner, LLP

(57) ABSTRACT

A collision detecting device and a collision detecting method are provided that enable accurate detection of a collision based on pressure change in a pressure chamber. A collision body discriminating system (10) is provided with: a chamber member (18) elongated in the vehicle width direction, having a pressure chamber (24) therein and provided in front of a bumper reinforcement (14); an absorber (20) elongated in the vehicle width direction and provided in front of the bumper reinforcement (14); a pressure sensor (22) for outputting a signal corresponding to a change in the pressure in the pressure chamber (24); and an ECU (26) for discriminating a collision body on the basis of a signal from the pressure sensor (22). The chamber member (18) and the absorber (20) are arranged in a vertical relationship with a gap (C) therebetween, and this allows the chamber member (18) and the absorber (20) to deform independently of each other when the collision body collides with the vehicle.

13 Claims, 10 Drawing Sheets

(56) References Cited

U.S. PATENT DOCUMENTS

| | | | |
|---|---|---|---|
| 7,293,809 B2* | 11/2007 | Suzuki et al. | 293/117 |
| 7,631,565 B2* | 12/2009 | Tanabe | 73/862.474 |
| 7,637,545 B2* | 12/2009 | Takahashi et al. | 293/132 |
| 7,686,358 B2* | 3/2010 | Takahashi et al. | 293/102 |
| 7,743,669 B2* | 6/2010 | Suzuki et al. | 73/800 |
| 7,768,381 B2* | 8/2010 | Takafuji et al. | 340/436 |
| 7,775,316 B2* | 8/2010 | Hosokawa et al. | 180/271 |
| 7,782,180 B2* | 8/2010 | Takafuji | 340/436 |
| 7,804,414 B2* | 9/2010 | Kiribayashi | 340/614 |
| 7,806,222 B2* | 10/2010 | Takahashi et al. | 180/274 |
| 7,828,350 B2* | 11/2010 | Kiribayashi | 293/117 |
| 7,868,748 B2* | 1/2011 | Kiribayashi | 340/436 |
| 7,881,843 B2* | 2/2011 | Murakami et al. | 701/45 |
| 2005/0200139 A1* | 9/2005 | Suzuki | 293/117 |
| 2006/0064220 A1* | 3/2006 | Murakami et al. | 701/45 |
| 2007/0132565 A1* | 6/2007 | Tanabe | 340/436 |
| 2007/0164574 A1* | 7/2007 | Tanabe | 293/102 |
| 2008/0122599 A1* | 5/2008 | Suzuki et al. | 340/436 |
| 2008/0258887 A1 | 10/2008 | Gelberi et al. | |
| 2008/0315598 A1* | 12/2008 | Takafuji et al. | 293/117 |
| 2009/0021030 A1* | 1/2009 | Tanabe | 293/117 |
| 2009/0021359 A1* | 1/2009 | Tanabe | 340/436 |
| 2009/0027181 A1* | 1/2009 | Tanabe et al. | 340/436 |
| 2009/0050395 A1* | 2/2009 | Hosokawa et al. | 180/274 |
| 2009/0312949 A1* | 12/2009 | Suzuki et al. | 701/301 |

FOREIGN PATENT DOCUMENTS

| | | | |
|---|---|---|---|
| JP | 11-310095 | | 11/1999 |
| JP | 2007-290689 | | 11/2007 |
| JP | 2008-230503 | | 10/2008 |
| JP | 2009-227089 | | 10/2009 |
| JP | 2009-234427 | | 10/2009 |
| JP | 2009220785 A | * | 10/2009 |
| JP | 2010052587 A | * | 3/2010 |
| JP | 2010167823 A | * | 8/2010 |
| JP | 2010285142 A | * | 12/2010 |

OTHER PUBLICATIONS

Applicant's Reply to Written Opinion of the International Searching Authority in International Application No. PCT/JP2009/069699 (Mailing Date of Written Opinion: Dec. 22, 2009).

* cited by examiner

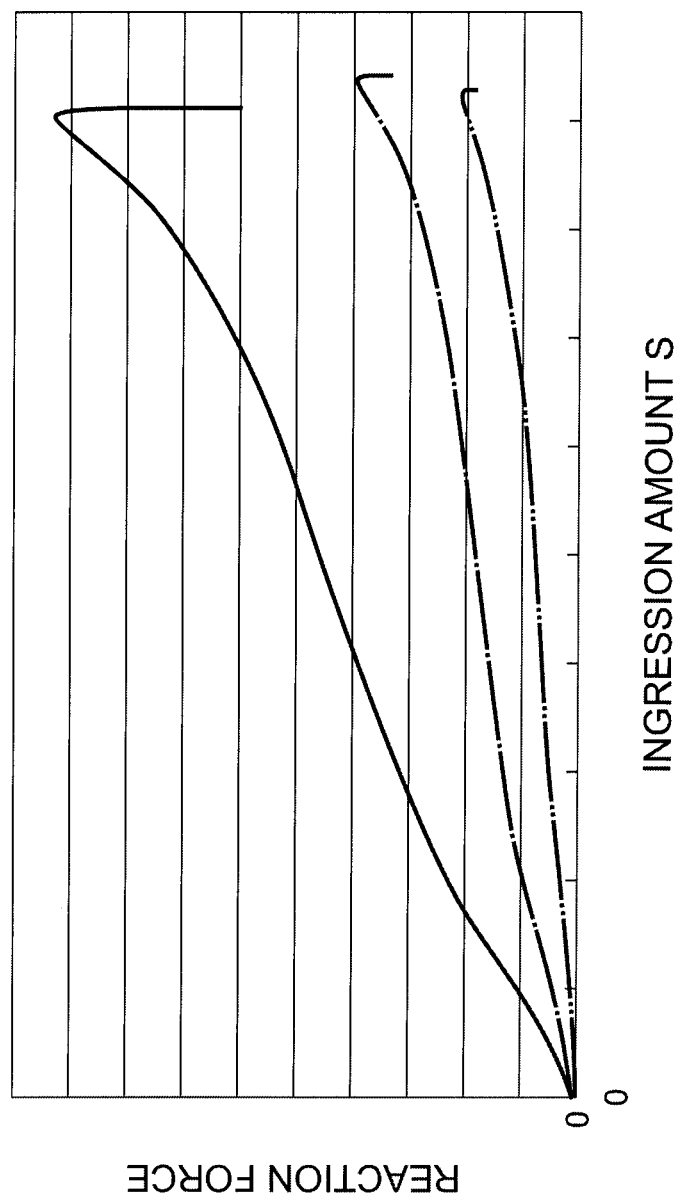

US 8,978,486 B2

COLLISION DETECTING DEVICE AND COLLISION DETECTING METHOD

CROSS-REFERENCE TO RELATED APPLICATIONS

This application is a national phase application of International Application No. PCT/JP2009/069699, filed Nov. 20, 2009, and claims the priority of Japanese Application No. 2008-307805, filed Dec. 2, 2008, the contents of both of which are incorporated herein by reference.

TECHNICAL FIELD

This invention relates to a collision detecting device that is for detecting a collision against a vehicle to which the device is applied and to a collision detecting method.

BACKGROUND ART

A vehicle collision discriminating device is known in which a hard impact absorbent material and a soft impact absorbent material are inserted inside a front bumper, and a collision detection tube filled with an incompressible fluid is inserted between the hard impact absorbent material and the soft impact absorbent material (see, for example, Japanese Patent Application Laid-open (JP-A) No. 11-310095 (FIGS. 13-15)). Further, a collision detection means is known in which plural through holes that penetrate in a vehicle front-rear direction are provided in a chamber member in order to adjust a deformation amount of the chamber member in accordance with a position in a longitudinal direction thereof, the through holes being filled with a foam resin (see, for example, JP-A No. 2007-290689 (FIG. 17 and paragraph [0103]).

DISCLOSURE OF INVENTION

Technical Problem

However, in the former technique described above, since the configuration is such that deformation of the collision detection tube is constrained by the impact absorbent materials, there are concerns that the accuracy of collision discrimination and detection by detection of changes in the pressure of the collision detection tube is reduced. Further, in the latter technique described above, since the foam resin only has sufficient strength so as not to alter the buckling properties of the chamber member, it substantially does not function as a buffering member and almost the entire collision load is supported by the chamber member.

In view of the above circumstances, the present invention aims to provide a collision detecting device and a collision detecting method that can accurately detect a collision based on a change in pressure of a pressure chamber.

Solution to Problem

A collision detecting device according to a first aspect of the present invention is provided with: a buffering member disposed longitudinally along a vehicle width direction and at an outer side in a vehicle front-rear direction relative to a bumper frame member; a chamber member having a pressure chamber inside, the chamber member provided longitudinally along the vehicle width direction with a pressure chamber inside and at a same side relative to the bumper frame member as the buffering member, the chamber member buckling (collapsing) and being deformed independently of the buffering member and at a smaller load than the buffering member, due to a load input from the outer side in the vehicle front-rear direction such that a volume of the pressure chamber is reduced; a pressure detector that outputs a signal in accordance with a change in pressure inside the pressure chamber; and a collision determination unit that assesses a collision against the bumper frame member from the outer side in the vehicle front-rear direction based on the signal from the pressure detector, wherein at least a part of the chamber member and a part of the buffering member are disposed so as to be spaced apart in a vehicle vertical direction, whereby the chamber member and the buffering member are deformed independently by a load input from the outer side in the vehicle front-rear direction.

The collision detecting device of the above aspect detects a collision from the outer side in the vehicle front-rear direction (for example, the front side relative to a bumper provided at a vehicle front portion or the rear side relative to a bumper provided at a vehicle rear portion) toward the side of a bumper frame member. When this kind of collision occurs, the chamber member, which is able to deform independently relative to the buffering member, buckles (collapses) and deforms in accordance with the amount to which a collision body compression-deforms the buffering member and ingresses toward the side of the bumper frame member, while constraint of the chamber member by (deformation of) the buffering member is suppressed. Further, at this time, the load (reaction force) embraced by the chamber member is considerably smaller than the load embraced by the buffering member. As a result, in the present collision detecting device, the change in volume caused by deformation of the chamber member substantially corresponds to the amount of compression deformation of the buffering member; that is, the support reaction force (collision load) generated by the buffering member.

Further, in the present collision detecting device, since it is possible to detect the volume change of the chamber member based on a signal from the pressure detector that detects the pressure in the chamber member, it is possible for the collision determination unit to accurately assess the collision based on a detected value that substantially corresponds to the collision load. Further, because the configuration is such that the chamber member, which buckles (collapses) and deforms at low load relative to the buffering member, is provided so as to be able to deform independently with respect to the buffering member, the configuration is simplified as it suffices, for example, to provide a hollow chamber member and a buffering member individually so as to support the collision load in parallel.

In this way, in the collision detecting device of the above aspect, it is possible to accurately detect a collision based on a change in pressure of a pressure chamber.

Further, in the collision detecting device of the above aspect, because at least a part of the chamber member and the buffering member are disposed so as to be spaced apart in a vehicle vertical direction, this space provides a deformation margin (escape margin) at a time of compression in the vehicle front-rear direction. As a result, constraint of the deformation of the chamber member by (deformation of) the buffering member is yet more effectively suppressed. That is, the chamber member and the buffering member are effectively permitted to deform independently.

In the above aspect, a configuration may be adopted in which at least a part of the chamber member and a part of the buffering member in the vehicle front-rear direction are disposed so as to be spaced apart in the vehicle vertical direction along an entire length in a longitudinal direction thereof.

In the collision detecting device of the above aspect, because a gap is formed between the chamber member and the buffering member along the entire length thereof in a longitudinal direction (vehicle width direction), this space provides a deformation margin (escape margin) at a time of compression in the vehicle front-rear direction. As a result, the chamber member and the buffering member are yet more effectively permitted to deform independently.

In the above aspect, a configuration may be adopted in which at least a part of the chamber member and a part of the buffering member in the longitudinal direction are spaced apart in the vehicle vertical direction along an entire length in the vehicle front-rear direction.

In the collision detecting device of the above aspect, because a gap is formed between the chamber member and the buffering member along the entire length thereof in a vehicle front-rear direction as seen in sectional view orthogonal to the longitudinal direction, this space provides a deformation margin (escape margin) at a time of compression in the vehicle front-rear direction. As a result, the chamber member and the buffering member are yet more effectively permitted to deform independently.

In the above aspect, a configuration may be adopted in which the buffering member is disposed at both of an upper side and a lower side relative to the chamber member in the vehicle vertical direction and is spaced apart from the chamber member in the vehicle vertical direction.

In the collision detecting device of the above aspect, (portions of) the buffering member are disposed at both upper and lower sides relative to the chamber member and gaps are formed between the buffering member and both of the upper and lower sides of the chamber member. As a result, in a configuration in which the buffering member is positioned above and below the chamber member, the spaces positioned above and below the chamber member provide a deformation margin (escape margin) at a time of compression in the vehicle front-rear direction, and this chamber member and buffering member are effectively permitted to deform independently.

In the above aspect, a configuration may be adopted in which an end portion of the buffering member at the outer side in the vehicle front-rear direction is disposed at a same position in the vehicle front-rear direction or at a position projected toward the outer side in the vehicle front-rear direction relative to an end portion of the chamber member at the outer side in the vehicle front-rear direction.

In the collision detecting device of the above aspect, because the end portion at the collision side of the buffering member is positioned at the same position in the vehicle front-rear direction, or projecting toward the collision side, relative to the end portion at the collision side of the chamber member, the chamber member is inhibited from deforming by itself. As a result, excessive deformation of the chamber member in the event of, for example, a minor collision is effectively suppressed.

In the above aspect, a configuration may be adopted in which an end portion of the buffering member at an inner side in the vehicle front-rear direction contacts the bumper frame member.

In the collision detecting device of the above aspect, because the end portion of the buffering member at the opposite side to the collision side contacts the bumper frame member, the buffering member deforms and supports (a portion of) the collision load from the beginning of a collision and the chamber member is effectively inhibited from deforming by itself.

In the above aspect, a configuration may be adopted in which the buffering member is formed from a material that generates a reaction force corresponding to a change in volume caused by compression-deformation.

In the collision detecting device of the above aspect, the buffering member generates a reaction force corresponding (substantially proportional) to the amount of compression deformation buckling amount at the time of a collision. Further, as described above, the change in pressure (volume) of the pressure chamber substantially corresponds to the amount of compression deformation of the buffering member. Accordingly, the collision determination unit can yet more accurately obtain a detection value corresponding to the collision load based on the signal output from the pressure detector.

In the above aspect, a configuration may be adopted in which the collision determination unit detects a collision load based on a signal from the pressure detector and assesses the collision based on the collision load.

In the collision detecting device of the above aspect, the collision determination unit detects the collision load based on a signal output from the pressure detector, that is, based on a change in pressure of the pressure chamber. In the present collision detecting device, because the pressure change of the pressure chamber substantially corresponds to the amount of compression deformation of the buffering member as described above, the collision load can be accurately detected.

In the above aspect, a configuration may be adopted in which the collision determination unit discriminates (determines) a collision body that has collided at the bumper frame member side from the outer side in the vehicle front-rear direction based on a collision load that has been detected based on collision velocity information and a change in pressure of the pressure chamber.

In the collision detecting device of the above aspect, it is possible, for example, to calculate the effective mass by dividing a time-integrated value for the collision load by the collision velocity and to discriminate the collision body based on the effective mass. Further, it is possible to discriminate the collision body in relation to a threshold value that is set in accordance with a time-integrated value for the collision load and with the collision velocity. In the present collision detecting device, discrimination of the collision body is highly accurate because the collision load can be accurately detected as described above.

A collision detecting method according to a second aspect of the present invention includes: disposing a chamber member that has a pressure chamber inside, and a buffering member that generates a reaction force in response to a change in volume caused by deformation, in a row in a vehicle vertical direction, and with at least a part thereof in the vehicle front-rear direction spaced apart in the vehicle vertical direction, such that each can deform independently of the other; detecting a change in pressure of the pressure chamber accompanying deformation of the chamber member as an impact caused by a collision with a collision body is absorbed by the buffering member; and detecting a collision load based on the change in pressure of the pressure chamber.

In the collision detecting method of the above aspect, a chamber member is deformed while the collision load is mainly supported by a buffering member. At this time, the buffering member generates a reaction force corresponding to the compression deformation amount (buckling amount) thereof. Further, the chamber member, which supports the collision load while deforming independently of the buffering member, changes in volume in substantial correspondence with the compression deformation amount of the buffering member accompanying the ingression of the collision body towards the side of the bumper frame member. As a result, the change of pressure of the pressure chamber substantially corresponds to the change in volume of the buffering member, that is, to the collision load, and (a detection value corresponding to) the collision load can be accurately detected based on the pressure change of the pressure chamber.

In the above aspect, a method may be adopted which further includes: detecting a collision velocity of the collision body; and discriminating (determining) the collision body based on the collision velocity and on the collision load detected based on the change in pressure of the pressure chamber.

In the collision detecting method of the above aspect, it is possible, for example, to calculate the effective mass by dividing a time-integrated value for the collision load by the collision velocity and to discriminate the collision body based on the effective mass. Further, it is possible to discriminate the collision body in relation to a threshold value that is set in accordance with a time-integrated value for the collision load and with the collision velocity. In the present collision detecting method, discrimination of the collision body is highly accurate because the collision load can be accurately detected as described above.

Advantageous Effects of Invention

As explained above, the collision detecting device and collision detecting method according to the present invention have the advantageous effect that a collision can be accurately detected based in a change in pressure of a pressure chamber.

BRIEF DESCRIPTION OF DRAWINGS

FIG. 4 is a diagrammatic drawing showing an example of the relationship between the buckling amount and reaction force of an absorber that is a part of the collision body discriminating system according to the first exemplary embodiment of the present invention.

BEST MODE FOR CARRYING OUT THE INVENTION

Figure 1:
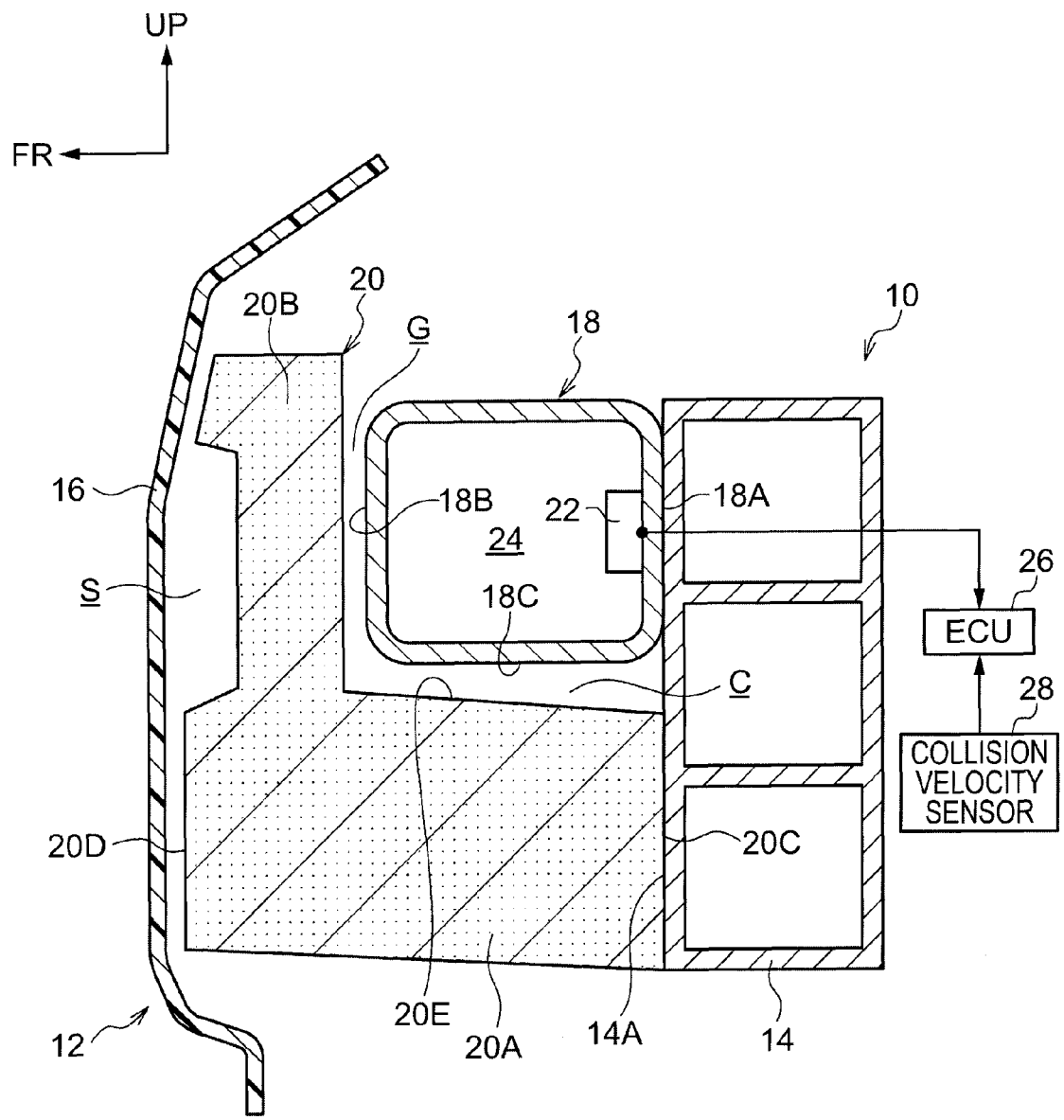
FIG. 1 shows a lateral sectional view of a general overall configuration of a collision body discriminating system according to a first exemplary embodiment of the present invention.

Collision body discriminating system 10 is explained as a collision detecting device according to a first exemplary embodiment of the present invention based on FIGS. 1-4. Further, in the drawings, the arrow FR indicates a forward direction in the front-rear direction of a vehicle body (direction of travel) and the arrow UP indicates an upward direction in the vertical direction of the vehicle body.

In FIG. 1, the general overall configuration of collision body discriminating system 10 is shown schematically in lateral sectional view. As shown in this drawing, collision body discriminating system 10 is applied to front bumper 12 positioned at the front end of the automobile to which it is applied such that it discriminates a collision body colliding against front bumper 12. Detailed explanation follows.

Front bumper 12 is provided with bumper reinforcement 14 as a bumper frame member. Bumper reinforcement 14 is formed, for example, from an iron-based or aluminum-based metal material and is configured as a frame member that is elongate in the vehicle width direction. Bumper reinforcement 14 is supported by the vehicle, spanning between the front ends of a pair of frame members (not shown) at left and right sides of the vehicle.

Front bumper 12 is provided with bumper cover 16, which covers bumper reinforcement 14 from the outer side (the front side) in the vehicle front-rear direction. Bumper cover 16 is configured from a resin material or the like and is supported in a fixed manner with respect to the vehicle body by a component not shown in the drawings, such that space S is formed between bumper cover 16 and bumper reinforcement 14.

Chamber member 18 and absorber 20, which is a buffering member, are disposed within spade S between bumper reinforcement 14 and bumper cover 16 in front bumper 12. Chamber member 18 is configured as a hollow structural body that is long in the vehicle width direction and is attached in a fixed manner to an upper portion of front surface 14A of bumper reinforcement 14. While not shown in the drawings, the positions of both ends in a length direction of chamber member 18 are substantially coincident with the positions of the ends of bumper reinforcement 14.

In a state in which chamber member 18 is attached to front surface 14A of bumper reinforcement 14 in a fixed manner at rear end part 18A thereof, chamber member 18 has sufficient rigidity to maintain the shape (the sectional shape shown in FIG. 1) thereof, and has a connecting hole that communicates with the atmosphere at a position that is not shown in the drawings. Accordingly, pressure chamber 24, which is a space inside chamber member 18, is configured to normally (statically) be at atmospheric pressure. Chamber member 18 is configured such that air escapes through the connecting hole when a relatively low compressive load is received from the front of the vehicle, whereupon chamber member 18 buckles (collapses) and the volume of pressure chamber 24 decreases.

Collision body discriminating system 10 is further provided with pressure sensor 22, which is a pressure detector that outputs a signal corresponding to the pressure of pressure chamber 24. Pressure sensor 22 is configured to output a signal corresponding to the pressure of pressure chamber 24 to ECU 26, which is described below. Further, pressure sensor 22 according to the present exemplary embodiment is configured to output a signal corresponding to atmospheric pressure to ECU 26 in addition to outputting a signal corresponding to the pressure of pressure chamber 24. ECU 26 is configured to assess a collision based on the signals from pressure sensor 22; that is, based on the dynamic pressure change accompanying a reduction in volume of pressure sensor 22.

Absorber 20 is formed, for example, from a foam material such as polypropylene foam (physical properties of the material are described below), and is attached in a fixed manner to a lower portion of the front surface of bumper reinforcement 14 independently of chamber member 18. Specifically, absorber 20 has absorber body 20A, which is positioned below chamber member 18 in a state in which it is attached to bumper reinforcement 14, and spacer portion 20B, which is positioned in front of chamber member 18. Rear end portion 20C of absorber body 20A of absorber 20 is fixed to (contacts) front surface 14A of bumper reinforcement 14.

As a result, absorber body 20A of absorber 20 is configured such that in response to an impact load from the front, it is mainly absorber body 20A that deforms (buckles) and absorbs the impact load. Spacer portion 20B of absorber 20 is configured to mainly transmit load to chamber member 18. Absorber 20 is configured such that front end part 20D of absorber body 20A is positioned further towards the front of the vehicle than front end part 18B of chamber member 18. In the present exemplary embodiment, space G is formed between spacer portion 20B and (front end part 18B of) chamber member 18. As a result, front end part 20D of absorber body 20A can be understood to project ahead of front end part 18B of chamber member 18 substantially only to the extent of the interval of space G.

Figure 3A:
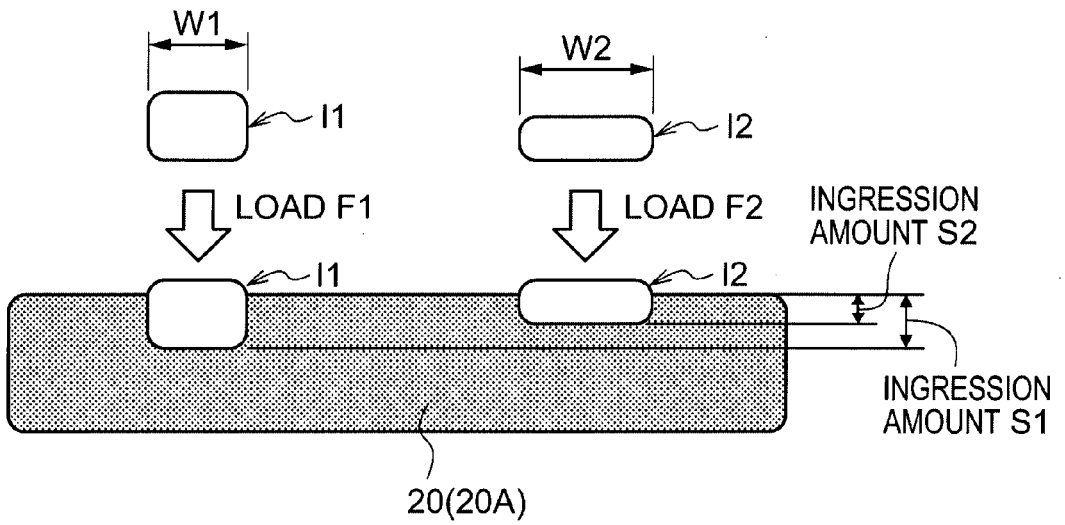
FIG. 3A is a drawing schematically showing deformation caused by a collision by a collision body, in order to explain the properties of an absorber that is a part of the collision body discriminating system according to the first exemplary embodiment of the present invention.

Absorber 20 is configured from a material with which ingression volume V of collision body I accompanying a collision with collision body I is substantially proportional to collision load F. For example, as shown in FIG. 3A, if S1 is the ingression amount (depth) of collision body I1 into absorber 20 when collision body I1 having a width of W1 in the vehicle width direction collides with a load of F1, α is the proportionality constant, V1 is the ingression volume and H is the height of absorber 20 in the vehicle vertical direction:

$$F1 = \alpha \times W1 \times H \times S1 = \alpha \times V1$$

Similarly, if S2 is the ingression amount of collision body I2 into absorber 20 when collision body I2 having a width of W2 in the vehicle width direction collides with a load of F2, α is the proportionality constant, and V2 is the ingression volume:

$$F2 = \alpha \times W2 \times H \times S2 = \alpha \times V2$$

Figure 3B:
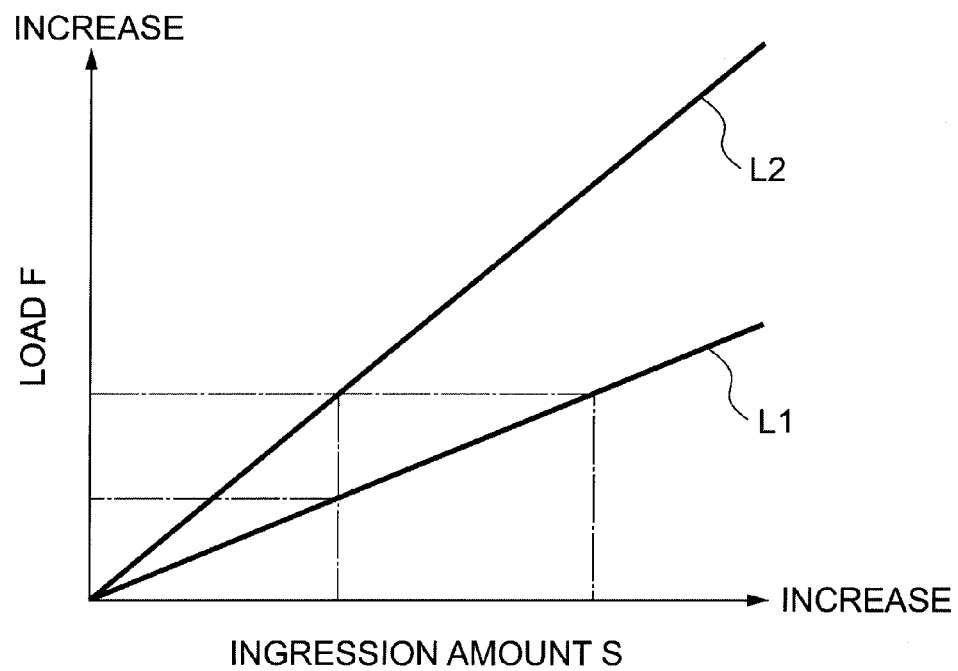
FIG. 3B is a diagrammatic drawing that conceptually shows the relationship between the ingression amount and load of a collision body, in order to explain the properties of an absorber that is a part of the collision body discriminating system according to the first exemplary embodiment of the present invention.

Accordingly, when absorber 20 is formed from a material with which the reaction force/ingression amount properties have an approximately proportional relationship as shown in FIG. 4, load and volume change in absorber 20 are proportional (α is constant) irrespective of the width of collision body I, as shown conceptually in FIG. 3B. That is, in absorber 20 that is a part of collision body discriminating system 10, the following relationship is established:

$$F1/F2 = V1/V2$$

To explain further regarding FIG. 3B, line L1 indicates the relationship between ingression amount S and load F (reaction force) in the case of a collision with collision body I1 having a width W1, and line L2 indicates the relationship between ingression amount S and load F (reaction force) in the case of a collision with collision body I2 having a width W2 (>W1). From the drawing, it is understood that if load F is constant, the ingression amount S of collision body I1 having a relatively small width W is larger, and the ingression amount S of collision body I2 having a relatively large width is smaller. Further, FIG. 4 shows the properties of samples when collision body I having a constant width W was collided with the samples having altered expansion ratios.

The structural components of collision body discriminating system 10 explained above are configured such that, when a collision occurs at front bumper 12 directed from front to rear (bumper reinforcement 14), load is transmitted to bumper reinforcement 14 via absorber body 20A of absorber 20 and chamber member 18. That is, the configuration provides, in parallel, a route by which load is transmitted to bumper reinforcement 14 via absorber body 20A and a route by which load is transmitted to bumper reinforcement 14 via chamber member 18. Further, load (support reaction force) that is transmitted to bumper reinforcement 14 concomitant with deformation of chamber member 18 is set so as to be sufficiently small (negligible) with respect to the support reaction force of absorber 20.

In the present exemplary embodiment, space C is formed between upper surface 20E of absorber body 20A and lower surface 18C of chamber member 18 such that chamber member 18 and absorber body 20A can deform independently. Space C has sufficient volume to be able to absorb any downward expansion accompanying compression of chamber member 18 towards the rear. As a result, collision body discriminating system 10 is configured such that chamber member 18 can deform without interfering with (being constrained by) absorber body 20A. In the present exemplary embodiment, space C extends the entire length in the vehicle front-rear direction as seen in lateral view (sectional view orthogonal to the length direction) as shown in FIG. 1. Further, while not shown in the drawings, space C is formed to extend substantially along the entire length in the vehicle width direction, that is, the entire length of chamber member 18.

As a result, in collision body discriminating system 10, when collision body I having greater length in the vehicle vertical direction collides with front bumper 12, the width and ingression amount of collision body I with respect to chamber member 18 is substantially the same as the width and ingression amount of collision body I with respect to absorber 20. As a result, collision body discriminating system 10 is configured such that, in principle, the volume change ΔV of chamber member 18 accompanying a collision at front bumper 12 is approximately proportional to (the same as) ingression volume V (collision load F) of collision body I into absorber 20, and collision load F is mainly (almost all) supported by absorber 20. As a result, collision body discriminating system 10 is configured such that the collision load can be determined using the volume change of chamber member 18, as described below.

Further, collision body discriminating system 10 is provided with ECU 26, which serves as a collision assessment unit. ECU 26 is electrically connected to pressure sensor 22 and determines (calculates) collision load F based on signals from pressure sensor 22. Specifically, when the initial volume of pressure chamber 24 inside chamber member 18 is V0, the initial pressure is P0, the volume change is ΔV, and the pressure change is ΔP, the following relationship is established:

$$P0 \times V0 = (P0+\Delta P) \times (V0-\Delta V)$$

Accordingly, ΔV, which corresponds to ingression volume V into absorber 20, can be obtained as:

$$\Delta V = V0 \times \Delta P/(P0+\Delta P)$$

In ECU 26 according to the present exemplary embodiment, initial volume V0 is stored (set) in advance and initial pressure P0 is stored in advance as standard atmospheric pressure. ECU 26 performs the calculation V0×ΔP/(P0+ΔP) that is proportional to collision load F based on signals from pressure sensor 22; that is, based on the pressure change ΔP of pressure chamber 24.

In the present exemplary embodiment, the above-described proportionality constant α is set (for example, α=50) and collision load F itself is calculated as follows.

$$F = \alpha \times V0 \times \Delta P/(P0+\Delta P) \quad (1)$$

Further, the present exemplary embodiment is configured such that ECU 26 uses a value for pressure change ΔP of pressure chamber 24 that is adjusted as follows. Here, P0s is atmospheric pressure at time of measurement obtained based on a signal from pressure sensor 22 and Ps is the pressure at the time of measurement obtained based on a signal from pressure sensor 22.

$$\Delta P = (Ps - P0s) \times (P0/P0s)$$

In addition, ECU 26 is electrically connected to collision velocity sensor 28, which outputs a signal corresponding to the collision velocity with collision body I. Collision velocity sensor 28 may be configured using, for example, the vehicle speed sensor. Further, the time-differentiated output of a distance sensor such as a millimeter-wave radar may be used as the output of collision velocity sensor 28.

ECU 26 is configured to determine the effective mass m of collision body I from a time-integrated value for the above-described collision load F(t) and from collision velocity v. Specifically, from $$m \times v = \int F(t) dt$$

effective mass m of collision body I is determined according to:

$$m = \int F(t) dt / v \quad (2)$$

In addition, ECU 26 according to the present exemplary embodiment is configured to discriminate collision body I based on effective mass m. Specifically, when effective mass m calculated as described above exceeds threshold T, ECU 26 determines that collision body I is a pedestrian. As a result, the configuration of collision body discriminating system 10 enables discrimination of whether collision body I colliding with front bumper 12 is a pedestrian or a fixed body on a road such as a roadside marker pole. This discrimination method is described together with the operation of the present exemplary embodiment.

When, for example, it is determined that collision body I is a pedestrian, ECU 26 outputs a signal corresponding to the fact that collision body I is a pedestrian to, for example, a pedestrian safety ECU for controlling a safety device for pedestrians. In addition, ECU 26 may be configured to double as a pedestrian safety ECU.

Next, the operation of the first exemplary embodiment is explained.

In collision body discriminating system 10 having the above configuration, when collision body I collides from the front with any portion in the vehicle width direction of front bumper 12, a collision load acts towards the rear at the collision portion. As a result, absorber 20 supports the collision load (generates a reaction force) and, at the same time, undergoes compression deformation to an extent commensurate with the collision load. On the other hand, chamber member 18 is compressed without generating almost any reaction force and the volume of pressure chamber 24 is reduced by an amount approximately corresponding to the amount of compression deformation of absorber 20.

A signal from pressure sensor 22 accompanying the volume change of pressure chamber 24 is input to ECU 26. That is, a signal corresponding to the pressure inside pressure chamber 24 and a signal corresponding to atmospheric pressure are input to ECU 26 and, in addition, a signal corresponding to the collision velocity is input from collision velocity sensor 28.

ECU 26 calculates effective mass m by performing a time-integration on the collision load F determined from the above equation (1) and, as in equation (2), dividing a time-integrated value for collision load F by the collision velocity v. Further, during the period of collision, ECU 26 repeatedly determines whether or not effective mass m exceeds threshold T and, when effective mass m exceeds threshold T, determines that collision body I is a pedestrian.

Figure 2A:
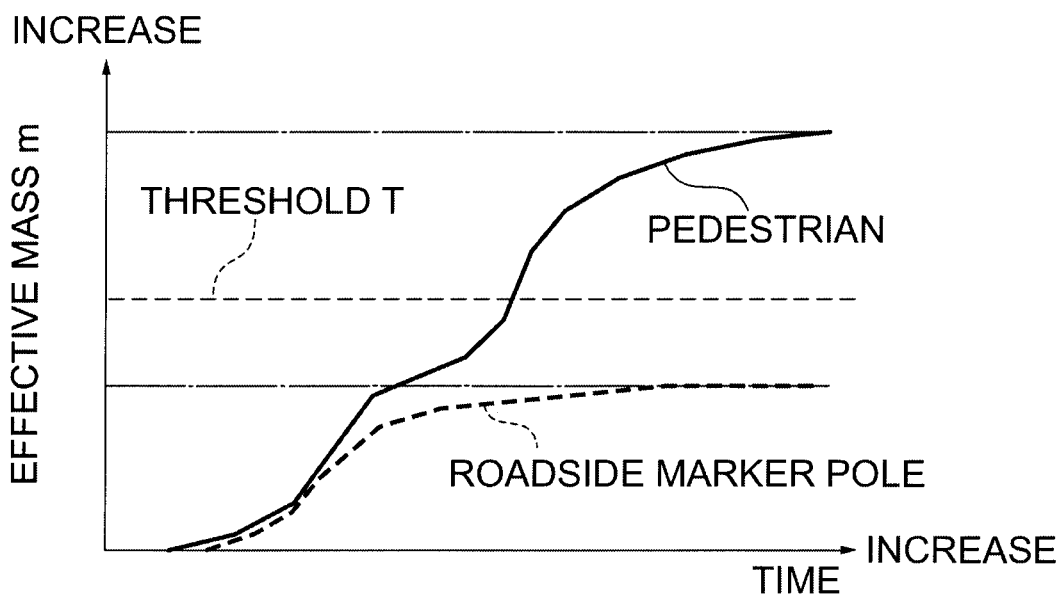
FIG. 2A shows a diagrammatic drawing for explaining a method by which the collision body discriminating system according to the first exemplary embodiment of the present invention discriminates a collision body based on effective mass.
Figure 2B:
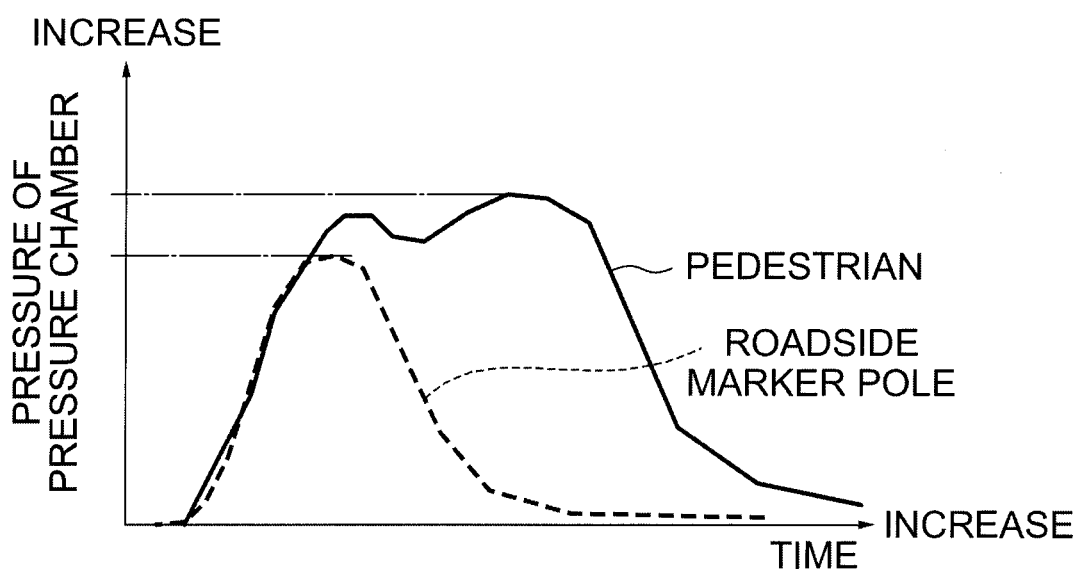
FIG. 2B shows a diagrammatic drawing for explaining a method for discriminating a collision body based on chamber pressure according to a comparative example.

Below, supplementary explanation is given regarding the method by which ECU 26 discriminates collision body I. In FIG. 2A, a typical variation over time of effective mass m in a case of collision with a pedestrian is shown with a solid line and a typical variation over time of effective mass m in a case of collision with a roadside marker pole is shown with a dashed line. Further, in FIG. 2B, a typical pressure waveform (pressure sensor 22 output signal) in a case of collision with a pedestrian is shown with a solid line and a typical variation over time of a pressure waveform in a case of collision with a roadside marker pole is shown with a dashed line. As shown in FIG. 2B, it is evident that while there is a difference in the duration of the pressure for a pedestrian and a roadside marker pole, the difference in peak pressure is small. As a result, there are cases when it is difficult to effectively set a threshold for a pressure waveform peak value (if the threshold for reliably detecting a pedestrian is set low, there may be cases when a roadside marker pole is mistakenly identified as a pedestrian).

In contrast, in collision body discriminating system 10, since the threshold is set for effective mass m, for which there is a large difference (large margin) between a pedestrian and a roadside marker pole as shown in FIG. 2A, a pedestrian and a roadside marker pole can be consistently discriminated. To explain further regarding FIG. 2A, since, in the case of a collision with a roadside marker pole, front bumper 12 (the automobile) is relatively displaced in a direction away from the roadside marker pole due to reaction force after impact, the duration of pressure is short as shown in FIG. 2B. As a result, the waveform of effective mass m based on time-integrated values of collision load F (pressure increase in pressure chamber 24) remains relatively low. On the other hand, since, in the case of a collision with a pedestrian, the pedestrian is relatively displaced by falling down toward the side of the engine hood, the input duration into front bumper 12 is longer (refer to FIG. 2B) and the waveform of effective mass m based on time-integrated values of collision load F reaches a higher value than in the case of a roadside marker pole.

Here, in collision body discriminating system 10 (collision body discriminating method), since chamber member 18 and absorber 20 are disposed so as to be able to be displaced independently of each other, chamber member 18 can be deformed without being constrained by the deformation of absorber 20 while absorber 20 supports (absorbs) the collision load. As a result, in collision body discriminating system 10, in principle, as described above, volume change ΔV of chamber member 18 is proportional (the same as) ingression volume V of collision body I into absorber 20.

Further, in collision body discriminating system 10, since absorber 20 is configured with a material that generates a support reaction force (collision load F) corresponding to ingression volume V of collision body I, collision load F can be accurately detected based on volume change ΔV of chamber member 18 (pressure sensor 22 signal). As a result, in collision body discriminating system 10, effective mass m is determined in ECU 26 based on time-integrated values of collision load F and collision body I can be accurately differentiated in accordance with whether or not effective mass m exceeds threshold T.

In particular, in collision body discriminating system 10, because space C is formed between the lower surface of chamber member 18 and the upper surface of absorber 20, a margin for deformation (escape) of chamber member 18 accompanying compression in a front-rear direction is secured. In addition, in collision body discriminating system 10, because space C is provided so as to extend along substantially the entire surface below chamber member 18, a sufficient escape margin for chamber member 18 is secured. As a result, constraint of the deformation of chamber member 18 by absorber 20 is effectively suppressed. That is, a configuration in which chamber member 18 deforms independently with respect to absorber 20 can be achieved with a simple configuration.

Further, in particular, in collision body discriminating system 10, absorber body 20A of absorber 20 projects further forward than chamber member 18 (in the present exemplary embodiment, space G is provided between spacer portion 20B and chamber member 18) and, in addition, rear end portion 20C of absorber body 20A is fixed to (contacts) front surface 14A of bumper reinforcement 14. As a result, compression deformation of chamber member 18 on its own is prevented. Therefore, in collision body discriminating system 10, excessive deformation of chamber member 18 in the event, for example, of a minor collision is prevented, which helps to prevent erroneous detection.

In addition, in collision body discriminating system 10, because space C is provided between chamber member 18 and absorber 20 as described above, the manufacturing process can be simplified as compared, for example, with a configuration in which a chamber is formed inside a buffering member. In particular, in collision body discriminating system 10, because chamber member 18 and absorber 20 are independently attached to bumper reinforcement 14, the manufacturing process can be yet further simplified. Further, in particular, because chamber member 18 that is a part of collision body discriminating system 10 communicates with the atmosphere via a connecting hole or, in other words, because it is unnecessary to fill chamber member 18 with a filling material such as an incompressible fluid, manufacture is easier than for a configuration into which this kind of filling material is filled.

Next, other exemplary embodiments of the present invention are explained. Parts and portions that are essentially the same as in the above-described first exemplary embodiment or in previously-described configurations are provided with the same reference numerals as in the above-described first exemplary embodiment or in the previously-described configurations and explanation thereof is omitted. Further, in FIGS. 5-10 showing the other embodiments, pressure sensor 22, ECU 26 and collision velocity sensor 28 are omitted from the drawings.

Second Exemplary Embodiment

Figure 5:
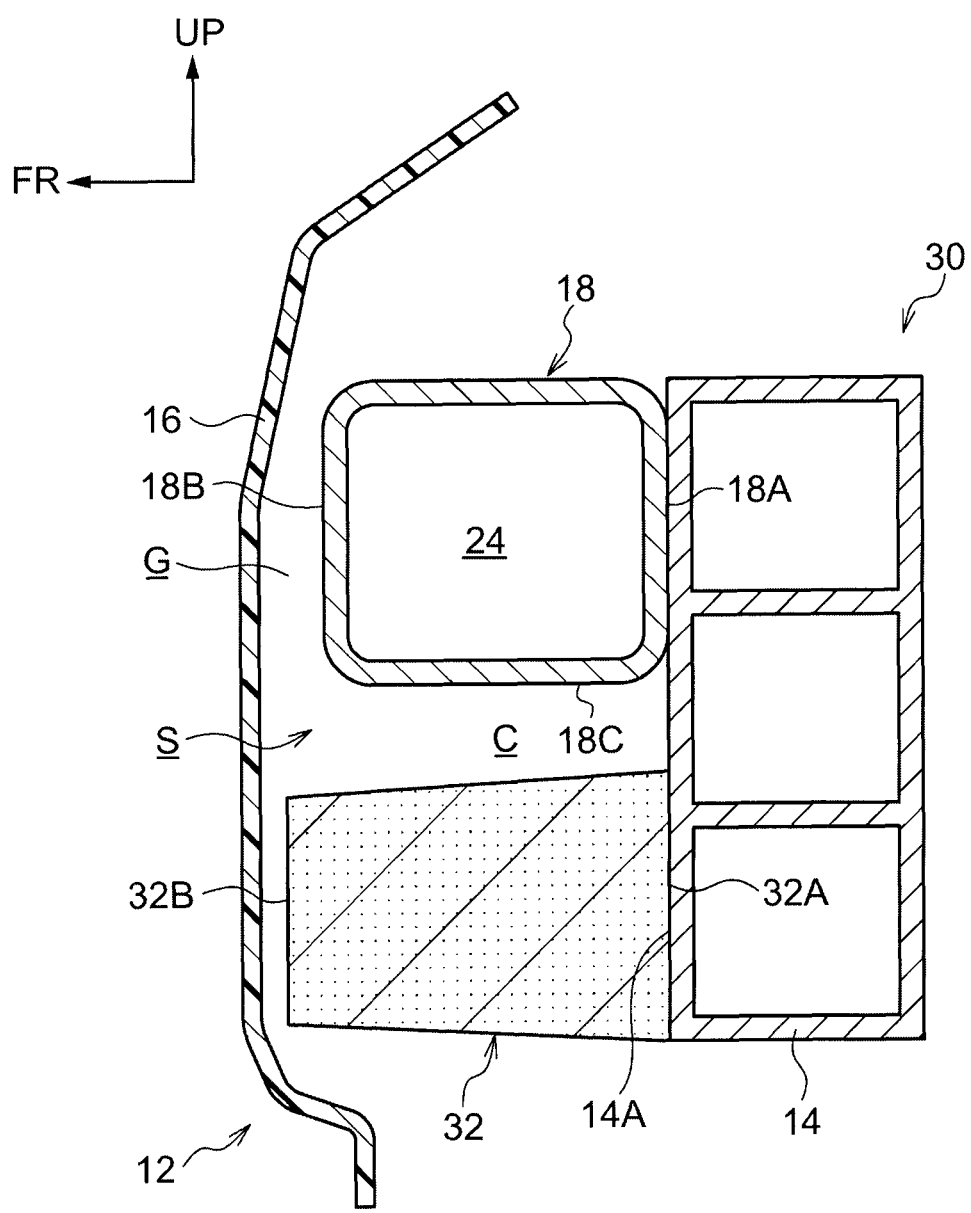
FIG. 5 shows a lateral sectional view of the main portions of a collision body discriminating system according to a second exemplary embodiment of the present invention.

In FIG. 5, collision body discriminating system 30 is shown as a collision detecting device according to a second exemplary embodiment of the present invention in schematic lateral sectional view. As shown in FIG. 5, collision body discriminating system 30 differs from collision body discriminating system 10 according to the first exemplary embodiment in that absorber 32 is provided as a buffering member instead of absorber 20.

Absorber 32 is configured as if absorber 20 has had spacer portion 20B removed therefrom. Rear end portion 32A of absorber 32 is fixed to (contacts) front surface 14A of bumper reinforcement 14 and, in addition, front end portion 32B of absorber 32 projects further forward in a vehicle front-rear direction than front end portion 18B of chamber member 18. The remainder of the configuration of collision body discriminating system 30 is the same as the corresponding configuration of collision body discriminating system 10.

Accordingly, essentially the same effects can be obtained by the same operations by collision body discriminating system 30 according to the second exemplary embodiment as by collision body discriminating system 10 according to the first exemplary embodiment.

Third Exemplary Embodiment

Figure 6:
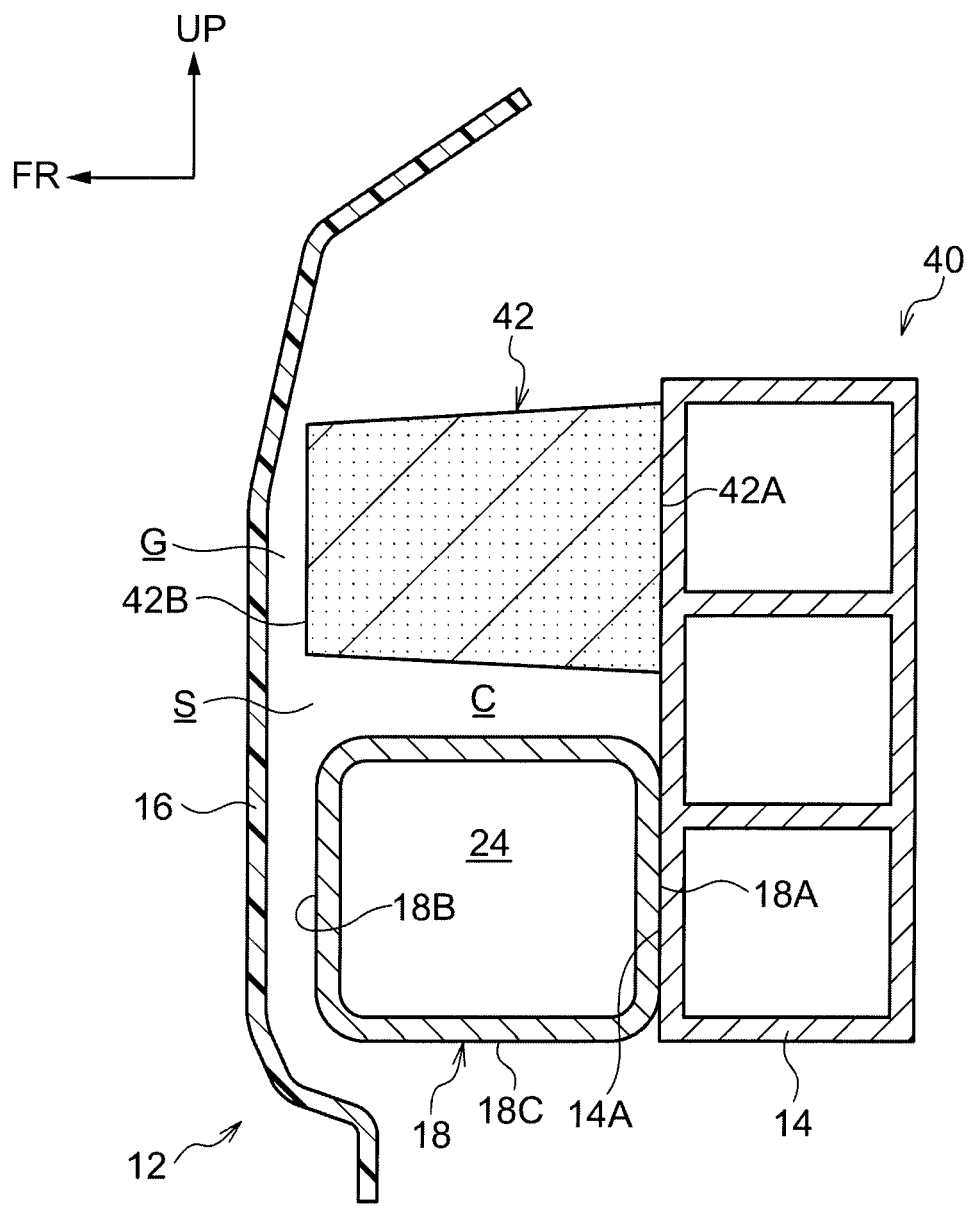
FIG. 6 shows a lateral sectional view of the main portions of a collision body discriminating system according to a third exemplary embodiment of the present invention.

In FIG. 6, collision body discriminating system 40 is shown as a collision detecting device according to a third exemplary embodiment of the present invention in schematic lateral sectional view. As shown in FIG. 6, collision body discriminating system 40 differs from collision body discriminating system 10 according to the first exemplary embodiment in that absorber 42 is provided as a buffering member instead of absorber 20 and in terms of the disposition of chamber member 18.

Rear end portion 18A of chamber member 18 is attached in a fixed manner to a lower part of front surface 14A of bumper reinforcement 14. Absorber 42 is formed with a similar shape to absorber 32 and is disposed above chamber member 18 with space C therebetween. Rear end portion 42A of absorber 42 is fixed to (contacts) front surface 14A of bumper reinforcement 14 and, in addition, front end portion 42B of absorber 42 is essentially aligned with the position in a vehicle front-rear direction of front end portion 18B of chamber member 18. That is, the length of absorber 42 in a vehicle front-rear direction substantially matches the length of chamber member 18 in a vehicle front-rear direction. The remainder of the configuration of collision body discriminating system 40 is the same as the corresponding configuration of collision body discriminating system 10.

Accordingly, essentially the same effects can be obtained by the same operations by collision body discriminating system 40 according to the third exemplary embodiment as by collision body discriminating system 10 according to the first exemplary embodiment.

In addition, in the third exemplary embodiment, an example has been shown in which the position in a vehicle front-rear direction of front end portion 42B of absorber 42 substantially matches the position in a vehicle front-rear direction of front end portion 18B of chamber member 18; however, the present invention is not limited to this. Accordingly, a configuration may be adopted in which, for example, instead of absorber 42, an upside-down version of absorber 20 or absorber 32 is disposed above chamber member 18. Further, absorber 42 may be provided instead of absorber 32 in the second exemplary embodiment.

Fourth Exemplary Embodiment

Figure 7:
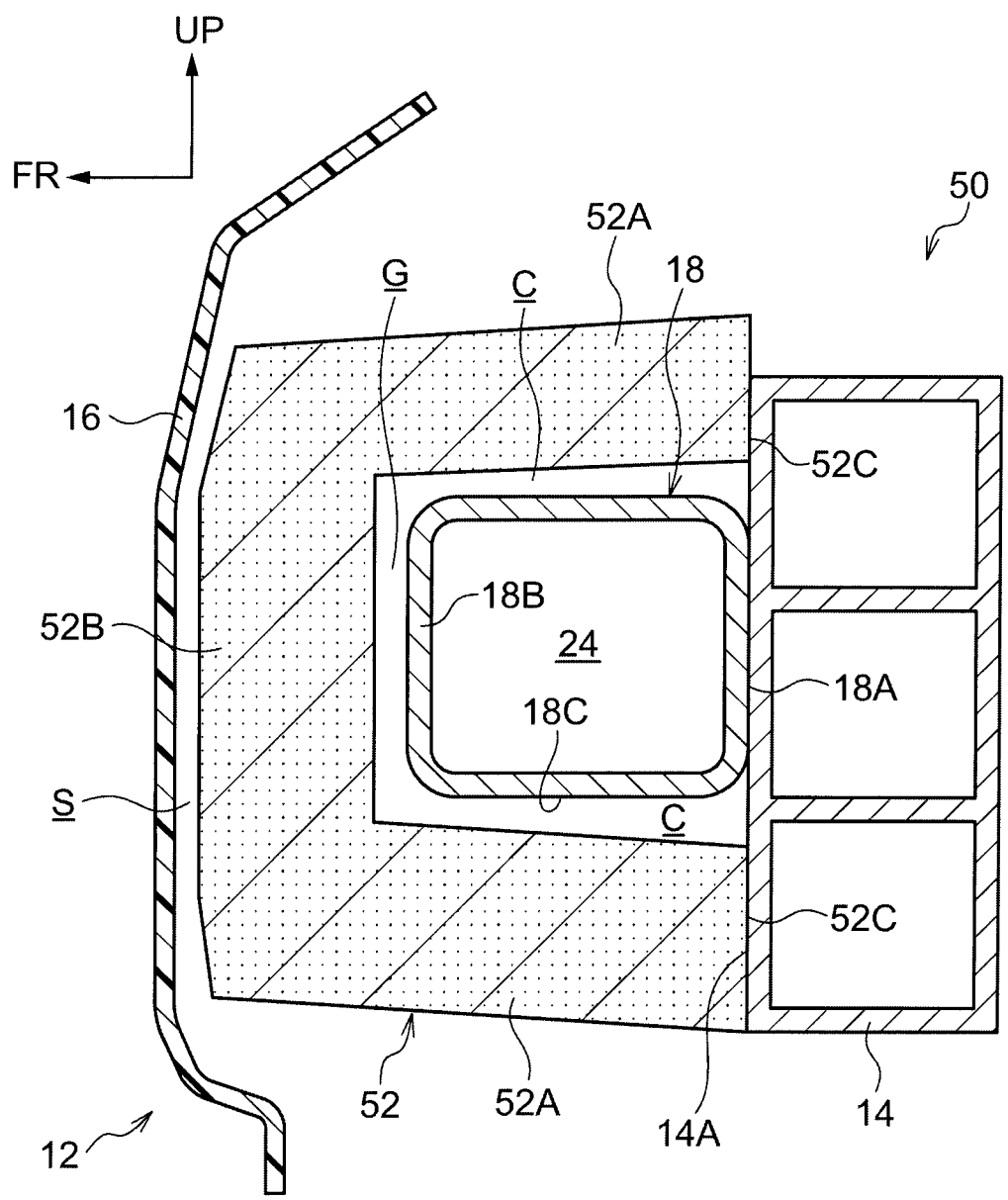
FIG. 7 shows a lateral sectional view of the main portions of a collision body discriminating system according to a fourth exemplary embodiment of the present invention.

In FIG. 7, collision body discriminating system 50 is shown as a collision detecting device according to a fourth exemplary embodiment of the present invention in schematic lateral sectional view. As shown in FIG. 7, collision body discriminating system 50 differs from collision body discriminating system 10 according to the first exemplary embodiment in that absorber 52 is provided as a buffering member instead of absorber 20 and in terms of the disposition of chamber member 18.

Rear end portion 18A of chamber member 18 is attached in a fixed manner to a substantially intermediate portion in a vertical direction of front surface 14A of bumper reinforcement 14. Absorber 52 is configured from an upper and lower pair of absorber bodies 52A and a spacer portion 52B that connects the front end portions of absorber bodies 52A, as the main components thereof. In a configuration in which chamber member 18 is positioned between upper and lower absorber bodies 52A of absorber 52, rear end portions 52C of absorber bodies 52A are fixed to (contact) front surface 14A of bumper reinforcement 14.

In this state, spaces C are formed between each of upper and lower absorber bodies 52A and chamber member 18 and space G is formed between spacer portion 52B and front end portion 18B of chamber member 18. The remainder of the configuration of collision body discriminating system 50 is the same as the corresponding configuration of collision body discriminating system 10.

Accordingly, essentially the same effects can be obtained by the same operations by collision body discriminating system 50 according to the fourth exemplary embodiment as by collision body discriminating system 10 according to the first exemplary embodiment.

Further, in the exemplary embodiment described above, an example has been shown in which absorber 52 has spacer portion 52B; however, the present invention is not limited to this and, for example, a configuration may be adopted in which absorber 52 is simply formed from the upper and lower pair of absorber bodies 52A. In this case, a configuration may be adopted in which absorber bodies 52A project further forward than front end portion 18B of chamber member 18 similarly to absorber 32. Further, in this case, a configuration may be adopted in which they are substantially aligned with the position in a vehicle front-rear direction of front end portion 18B of chamber member 18 similarly to absorber 42. Further, the positions of the front ends of upper and lower absorber bodies 52A may differ.

Fifth Exemplary Embodiment

Figure 8:
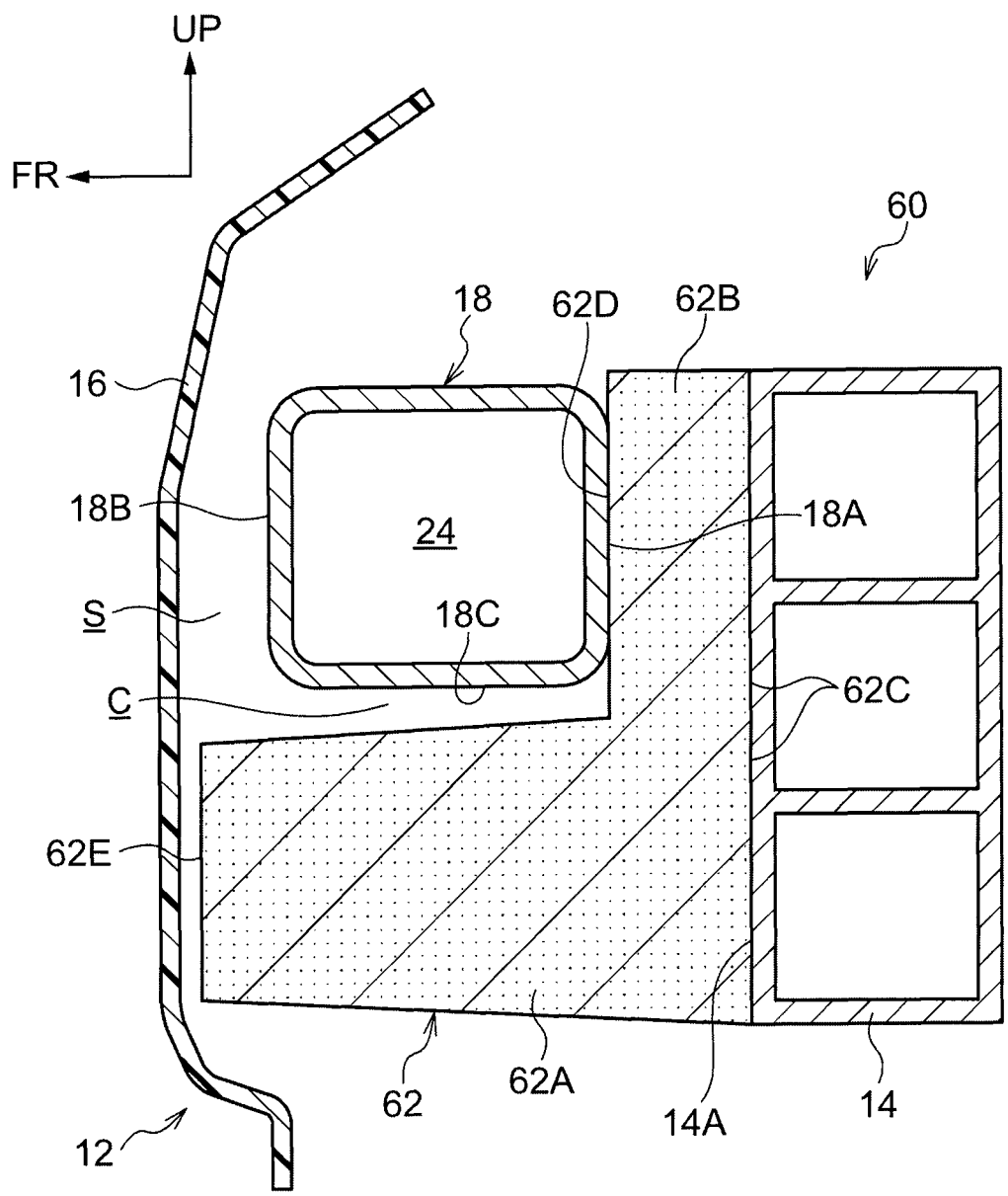
FIG. 8 shows a lateral sectional view of the main portions of a collision body discriminating system according to a fifth exemplary embodiment of the present invention.

In FIG. 8, collision body discriminating system 60 is shown as a collision detecting device according to a fifth exemplary embodiment of the present invention in schematic lateral sectional view. As shown in FIG. 8, collision body discriminating system 60 differs from collision body discriminating system 10 according to the first exemplary embodiment in that absorber 62 is provided as a buffering member instead of absorber 20 and in terms of the disposition of chamber member 18.

Absorber 62 is configured from absorber body 62A, which has a similar shape to absorber 32, and spacer portion 62B, which is provided standing upright from the rear end of absorber body 62A. Absorber 62 is fixed to (contacts) front surface 14A of bumper reinforcement 14 at rear end portion 62C of absorber body 62A and spacer portion 62B.

In the present exemplary embodiment, chamber member 18 is fixed to front end portion 62D of spacer portion 62B of absorber 62. In this state, space C is formed between chamber member 18 and absorber body 62A. Further, front end 62E of absorber body 62A projects further forward in a vehicle front-rear direction than front end portion 18B of chamber member 18. The remainder of the configuration of collision body discriminating system 60 is the same as the corresponding configuration of collision body discriminating system 10.

Accordingly, essentially the same effects can be obtained by the same operations by collision body discriminating system 60 according to the fifth exemplary embodiment as by collision body discriminating system 10 according to the first exemplary embodiment.

Further, in the fifth exemplary embodiment, an example has been shown in which front end 62E of absorber body 62A projects further forward in a vehicle front-rear direction than front end portion 18B of chamber member 18; however, the present invention is not limited to this. Accordingly, for example, a configuration may be adopted in which front end 62E of absorber 62 is substantially aligned with the position in a vehicle front-rear direction of front end portion 18B of chamber member 18.

Sixth Exemplary Embodiment

Figure 9:
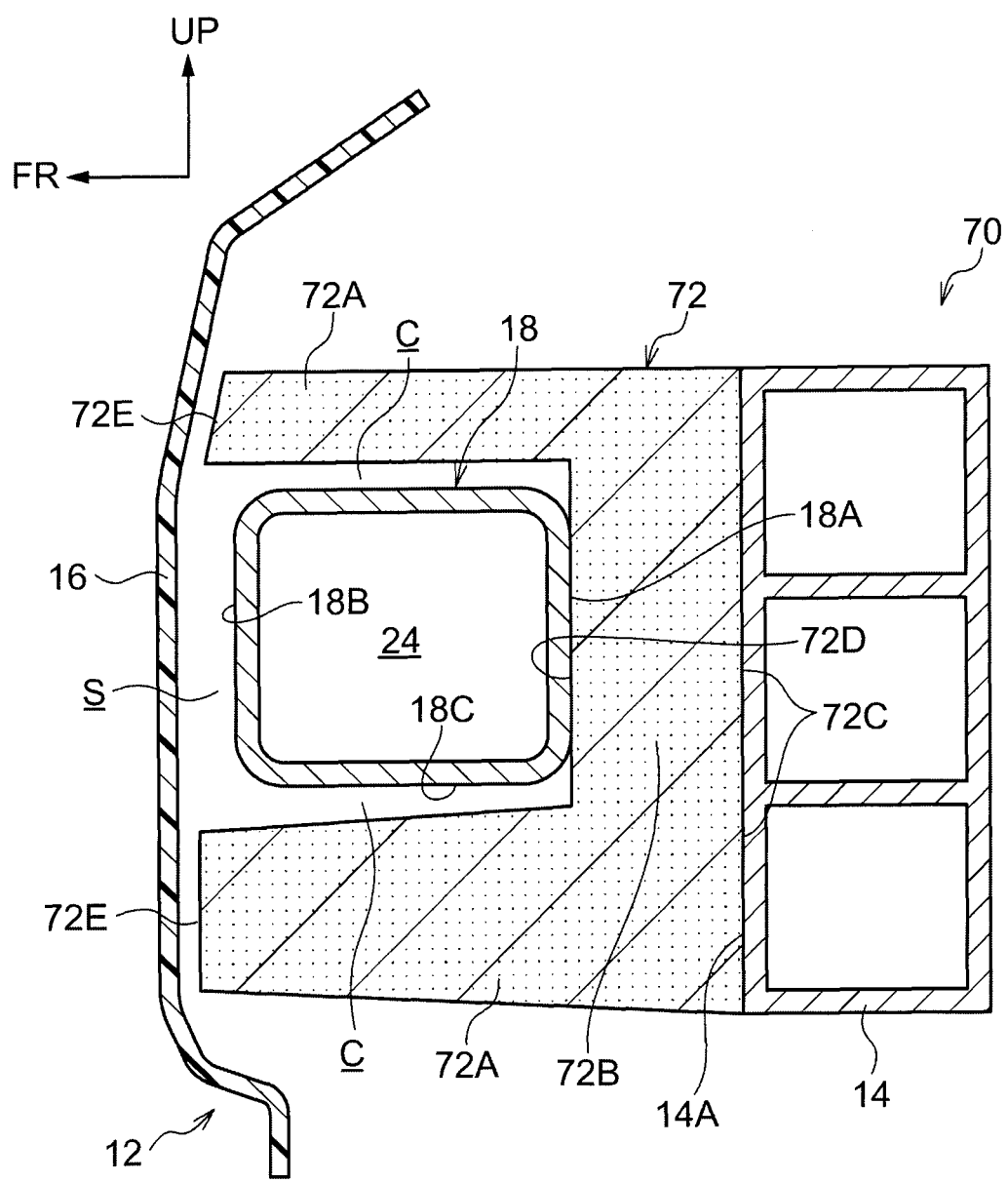
FIG. 9 shows a lateral sectional view of the main portions of a collision body discriminating system according to a sixth exemplary embodiment of the present invention.

In FIG. 9, collision body discriminating system 70 is shown as a collision detecting device according to a sixth exemplary embodiment of the present invention in schematic lateral sectional view. As shown in FIG. 9, collision body discriminating system 70 differs from collision body discriminating system 10 according to the first exemplary embodiment in that absorber 72 is provided as a buffering member instead of absorber 20 and in terms of the disposition of chamber member 18.

Absorber 72 is configured from an upper and lower pair of absorber bodies 72A and a spacer portion 72B that connects the rear end portions of absorber bodies 72A, as the main components thereof. Absorber 72 is fixed to (contacts) front surface 14A of bumper reinforcement 14 at rear end portion 72C of absorber bodies 72A and spacer portion 72B.

In the present exemplary embodiment, chamber member 18 is fixed to front end portion 72D of spacer portion 72B between the pair of absorber bodies 72A of absorber 72. In this state, space C is formed between upper and lower absorber bodies 72A and chamber member 18. Further, front ends 72E of each of absorber bodies 72A project further forward in a vehicle front-rear direction than front end portion 18B of chamber member 18. The remainder of the configuration of collision body discriminating system 70 is the same as the corresponding configuration of collision body discriminating system 10.

Accordingly, essentially the same effects can be obtained by the same operations by collision body discriminating system 70 according to the sixth exemplary embodiment as by collision body discriminating system 10 according to the first exemplary embodiment.

Further, in the sixth exemplary embodiment, an example has been shown in which front ends 72E of each of upper and lower absorber bodies 72A project further forward in a vehicle front-rear direction than front end portion 18B of chamber member 18; however, the present invention is not limited to this and, for example, a configuration may be adopted in which at least one of respective front ends 72E of upper and lower absorber bodies 72A is substantially aligned with the position in a vehicle front-rear direction of front end portion 18B of chamber member 18.

Seventh Exemplary Embodiment

Figure 10:
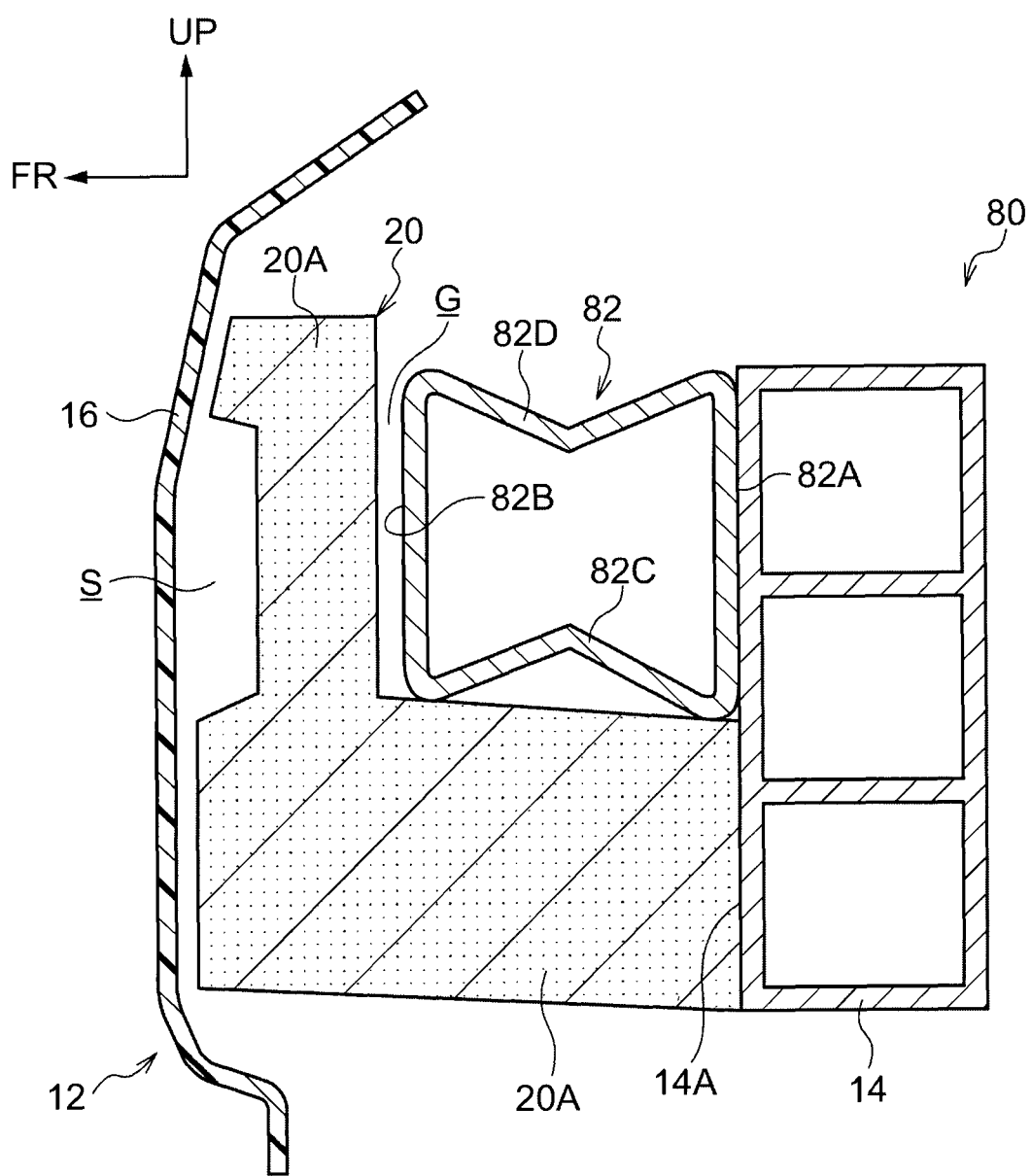
FIG. 10 shows a lateral sectional view of the main portions of a collision body discriminating system according to a seventh exemplary embodiment of the present invention.

In FIG. 10, collision body discriminating system 80 is shown as a collision detecting device according to a seventh exemplary embodiment of the present invention in schematic lateral sectional view. As shown in FIG. 10, collision body discriminating system 80 differs from collision body discriminating system 10 according to the first exemplary embodiment in that chamber member 82 is provided instead of chamber member 18.

Chamber member 82 shares with chamber member 18 the features of being attached in a fixed manner to front surface 14A of bumper reinforcement 14 at rear end portion 82A thereof and having space G provided between front end portion 82B thereof and spacer portion 20B. Chamber member 82 differs from chamber member 18 in that, as seen in lateral sectional view, lower wall 82C forms a concave shape opening in a downward direction and upper wall 82D forms a concave shape opening in an upward direction.

Chamber member 82 is mounted on absorber body 20A of absorber 20. That is, the front and rear end portions of lower wall 82C of chamber member 82 both contact the upper surface of absorber body 20A slidably with low friction. As a result of this shape, chamber member 82 is configured such that when load is received in a front-rear direction, chamber member 82 is compressed frontward-rearward and the volume of pressure chamber 24 changes as the angle of inflection of lower wall 82C and upper wall 82D is increased. Accordingly, chamber member 82 is configured such that it can deform independently of absorber 20 (is not constrained by absorber 20) in a configuration in which it is disposed in contact with absorber 20.

The shape of chamber member 82 can also be understood as a concertina shape. In other words, chamber member 82 may be formed in a concertina shape in which lower wall 82C and upper wall 82D each have plural corrugations. The remainder of the configuration of collision body discriminating system 80 is the same as the corresponding configuration of collision body discriminating system 10.

Accordingly, essentially the same effects can be obtained by the same operations by collision body discriminating system 80 according to the seventh exemplary embodiment as by collision body discriminating system 10 according to the first exemplary embodiment. Further, in collision body discriminating system 80, because chamber member 82 is configured to contact absorber 20 slidably with low friction, the load (reaction force) required for compression deformation can be reduced yet further by configuring chamber member 82 with lower rigidity than chamber member 18.

Further, in the seventh exemplary embodiment, an example has been shown in which chamber member 82 is combined with absorber 20; however, the present invention is not limited to this and, for example, a configuration may be adopted in which any of absorbers 32, 42, 52, 62, or 72 is combined with chamber member 82.

Further, in the seventh exemplary embodiment, an example has been shown in which a portion of chamber member 82 in the vehicle front-rear direction thereof contacts absorber body 20A; however, the present invention is not limited to this and, for example, a configuration may be adopted in which a portion of chamber member 82 in the length (vehicle width) direction thereof contacts absorber 20.

Further, in the respective exemplary embodiments described above, examples have been shown in which ECU 26 calculates and compares effective mass m with a threshold value; however, the present invention is not limited to this. Accordingly, a configuration (method) may be adopted in which it is determined whether collision body I is a pedestrian or a roadside marker pole by comparing time-integrated values for collision load F(t) with a threshold established in accordance with collision velocity v (a threshold that changes as collision velocity v changes). Further, the present invention is not limited to a configuration in which collision body I is differentiated by time-integrated values for collision load F(t) or effective mass m alone and, for example, collision body I may be differentiated by combined use of time-integrated values for collision load F(t) or effective mass m and the pressure waveform (collision load F).

In addition, in the respective exemplary embodiments described above, examples have been shown in which collision body discriminating systems 10-80 are applied to front bumper 12; however, the present invention is not limited to this and, for example, the respective configurations described above may be applied back-to-front to a rear bumper.

The invention claimed is:

1. A collision detecting device, comprising:
   a buffering member disposed longitudinally along a vehicle width direction and at an outer side in a vehicle front-rear direction relative to a bumper frame member;
   a chamber member having a pressure chamber inside, the chamber member provided longitudinally along the vehicle width direction with a pressure chamber inside and at a same side relative to the bumper frame member as the buffering member, the chamber member buckling and being deformed independently of the buffering member and at a smaller load than the buffering member, due to a load input from the outer side in the vehicle front-rear direction such that a volume of the pressure chamber is reduced;
   a pressure detector that outputs a signal in accordance with a change in pressure inside the pressure chamber; and
   a collision determination unit that assesses a collision against the bumper frame member from the outer side in the vehicle front-rear direction based on the signal from the pressure detector,
   wherein at least a part of the chamber member and a part of the buffering member are disposed so as to be spaced apart in a vehicle vertical direction, whereby the chamber member and the buffering member are deformed independently by a load input from the outer side in the vehicle front-rear direction, and
   wherein a front end part of the buffering member is positioned in front of a front end part of the chamber member in the vehicle front-rear direction, wherein the buffering member includes:
- a body that is positioned below the chamber member in the vehicle vertical direction; and
- a spacer portion that is positioned directly in front of the chamber member in the vehicle front-rear direction, the spacer portion extending from the body,
- wherein the spacer portion and the body are defined by a single, integral piece of material, and
- wherein the spacer portion of the buffering member is spaced apart from the chamber member in the vehicle front-rear direction.

2. The collision detecting device of claim 1, wherein at least a part of the chamber member and a part of the buffering member in the vehicle front-rear direction are disposed so as to be spaced apart in the vehicle vertical direction along an entire length in a longitudinal direction thereof.

3. The collision detecting device of claim 1, wherein at least a part of the chamber member and a part of the buffering member in the longitudinal direction are spaced apart in the vehicle vertical direction along an entire length in the vehicle front-rear direction.

4. The collision detecting device of claim 1, wherein the buffering member is disposed at both of an upper side and a lower side relative to the chamber member in the vehicle vertical direction and is spaced apart from the chamber member in the vehicle vertical direction.

5. The collision detecting device of claim 1, wherein an end portion of the buffering member at the outer side in the vehicle front-rear direction is disposed at a same position in the vehicle front-rear direction or at a position projected toward the outer side in the vehicle front-rear direction, relative to an end portion of the chamber member at the outer side in the vehicle front-rear direction.

6. The collision detecting device of claim 5, wherein an end portion of the buffering member at an inner side in the vehicle front-rear direction contacts the bumper frame member.

7. The collision detecting device of claim 1, wherein the buffering member is formed from a material that generates a reaction force corresponding to a change in volume caused by compression-deformation.

8. The collision detecting device of claim 7, wherein the collision determination unit detects a collision load based on a signal from the pressure detector and assesses the collision based on the collision load.

9. The collision detecting device of claim 8, wherein the collision determination unit discriminates a collision body that has collided at the bumper frame member side from the outer side in the vehicle front-rear direction based on a collision load that has been detected based on collision velocity information and a change in pressure of the pressure chamber.

10. The collision detecting device of claim 1, wherein a front face of the chamber member, an upper face of the chamber member, and a lower face of the chamber member are each spaced apart from the buffering member.

11. A collision detecting method, comprising:
- disposing a chamber member that has a pressure chamber inside, and a buffering member that generates a reaction force in response to a change in volume caused by deformation, in a row in a vehicle vertical direction, such that each can deform independently of the other;
- disposing a front end part of the buffering member in front of a front end part of the chamber member in a vehicle front-rear direction, wherein:
  - a body of the buffering member is disposed below the chamber member in the vehicle vertical direction,
  - a spacer portion of the buffering member directly is disposed in front of the chamber member in the vehicle front-rear direction, the spacer portion extending from the body;
  - the spacer portion of the buffering member and the body of the buffering member are defined by a single, integral piece of material; and
  - the spacer portion of the buffering member is spaced apart from the chamber member in the vehicle front-rear direction;
- detecting a change in pressure of the pressure chamber accompanying deformation of the chamber member as an impact caused by a collision with a collision body is absorbed by the buffering member; and
- detecting a collision load based on the change in pressure of the pressure chamber.

12. The collision detecting method of claim 11, further comprising:
- detecting a collision velocity of the collision body; and
- discriminating the collision body based on the collision velocity and on the collision load detected based on the change in pressure of the pressure chamber.

13. The collision detecting method of claim 11, wherein a front face of the chamber member, an upper face of the chamber member, and a lower face of the chamber member are each spaced apart from the buffering member.

* * * * *